(12) United States Patent
Cuny et al.

(10) Patent No.: US 8,532,840 B2
(45) Date of Patent: Sep. 10, 2013

(54) METHOD FOR DIAGNOSING BRAKE PEDAL CONTACTORS

(75) Inventors: Pierre Yves Cuny, Brunoy (FR); Anne Biemont, Arpajon (FR); Stephane George, Massy (FR)

(73) Assignee: Renault S.A.S., Boulogne Billancourt (FR)

( * ) Notice: Subject to any disclaimer, the term of this patent is extended or adjusted under 35 U.S.C. 154(b) by 526 days.

(21) Appl. No.: 12/594,866

(22) PCT Filed: Mar. 28, 2008

(86) PCT No.: PCT/FR2008/050554
§ 371 (c)(1), (2), (4) Date: Dec. 29, 2009

(87) PCT Pub. No.: WO2008/135698
PCT Pub. Date: Nov. 13, 2008

(65) Prior Publication Data
US 2010/0152959 A1 Jun. 17, 2010

(30) Foreign Application Priority Data
Apr. 6, 2007 (FR) ...................................... 07 54381

(51) Int. Cl.
*B60W 50/02* (2012.01)
*B60T 17/22* (2006.01)

(52) U.S. Cl.
USPC ................................................. 701/1; 303/20

(58) Field of Classification Search
None
See application file for complete search history.

(56) References Cited

U.S. PATENT DOCUMENTS

| 3,602,042 | A | * | 8/1971 | Mitchell | 73/126 |
|---|---|---|---|---|---|
| 4,063,311 | A | * | 12/1977 | Jeremiah et al. | 714/25 |
| 6,152,545 | A | * | 11/2000 | Mauser et al. | 303/20 |
| 6,212,449 | B1 | * | 4/2001 | Wellman et al. | 701/31.8 |
| 6,312,061 | B1 | * | 11/2001 | Schliebe et al. | 303/20 |
| 6,406,102 | B1 | * | 6/2002 | Arnold | 303/20 |
| 6,540,309 | B1 | * | 4/2003 | Jordan et al. | 303/122.07 |
| 6,709,069 | B2 | * | 3/2004 | Riddiford et al. | 303/20 |
| 6,748,310 | B2 | * | 6/2004 | Tamasho et al. | 701/70 |
| 6,997,521 | B2 | * | 2/2006 | Jensen et al. | 303/3 |
| 7,150,506 | B2 | * | 12/2006 | Nilsson et al. | 303/20 |
| 7,359,786 | B2 | * | 4/2008 | Lindqvist | 701/70 |
| 8,019,501 | B2 | * | 9/2011 | Breed | 701/31.9 |
| 2001/0006306 | A1 | * | 7/2001 | Kagawa et al. | 303/20 |
| 2002/0117891 | A1 | * | 8/2002 | Harris | 303/20 |

(Continued)

FOREIGN PATENT DOCUMENTS

| DE | 198 58 373 | | 6/1999 |
|---|---|---|---|
| EP | 0 428 338 | | 5/1991 |
| EP | 1 275 885 | | 1/2003 |
| EP | 0636817 | a2 * | 1/2003 |

*Primary Examiner* — James Trammell
*Assistant Examiner* — Jean-Paul Cass
(74) *Attorney, Agent, or Firm* — Oblon, Spivak, McClelland, Maier & Neustadt, L.L.P.

(57) ABSTRACT

A method for diagnosing brake pedal contactors of an automobile that includes an electronic control unit (ECU), the contactors being connected to the ECU and supplying thereto information on the pedal position. In the method the ECU tests the signals from the contactors. If the signals indicate the operation state is a so-called incoherent state, in which the brake pedal is considered by the ECU to be both depressed and released, the ECU initiates a time out, the duration of the time out depending on the vehicle speed.

7 Claims, 5 Drawing Sheets

(56) References Cited

U.S. PATENT DOCUMENTS

| | | | |
|---|---|---|---|
| 2004/0140710 A1* | 7/2004 | Alvarez et al. | 303/20 |
| 2004/0262990 A1* | 12/2004 | Check et al. | 303/113.1 |
| 2005/0216134 A1 | 9/2005 | Katrak et al. | |
| 2006/0224284 A1* | 10/2006 | Ueno et al. | 701/36 |
| 2007/0159001 A1* | 7/2007 | Miyazaki et al. | 303/113.4 |
| 2007/0176486 A1* | 8/2007 | Nakamura | 303/115.1 |

\* cited by examiner

METHOD FOR DIAGNOSING BRAKE PEDAL CONTACTORS

BACKGROUND

The present invention relates to a diagnostic method for contactors. It relates in particular to a diagnostics method for diagnosing the operation of contactors used to determine the position of a motor vehicle brake pedal.

Publication EP-0 428 338 describes a method of controlling a motor vehicle cruise control. During implementation of this method, a reduction in the speed of the vehicle below a predetermined threshold is detected. If this reduction takes place within a predetermined space of time without the brake contactors indicating pressure by the driver on the brake pedal, the contactors are considered to be defective.

A problem with this type of diagnostics lies in the fact that detection of the fault of the brake contactors is performed only under set conditions. Thus, for example, the vehicle speed needs to have dropped by 30 km/h in under two seconds in order for a fault to be detected.

Now, brake contactors may malfunction at any time whatsoever in the life of the vehicle and it is desirable to know their operating state in circumstances other than those defined in publication EP-0 428 338.

FIG. 1 is a schematic diagram of a brake pedal 1 equipped with two contactors A and B for determining the position of the brake pedal 1. The brake pedal 1 is also equipped with a return spring 3 which keeps it in a rest position when not actuated by a user.

As may be seen in FIG. 2, the information regarding the position of the brake pedal is transmitted to an electronic control unit (ECU) which processes it in order to determine the position of the pedal. Coherence between these signals also allows the ECU to determine the operating state of the contactors A and B.

One example of the signals supplied by the contactors A and B to the electronic control unit is depicted in FIG. 3. As a function of the logic signals 42 and 44 emitted by the contactors A and B, the electronic control unit interprets the state of the brake pedal. When the contactor A is supplying a high logic state and the contactor B is supplying a low logic state (zone 1), the ECU interprets that the brake pedal is in a state known as the released state. When the contactor A is supplying a low logic state and contactor B is supplying a high logic state (zone 3), the ECU interprets that the brake pedal is in a state known as the depressed state.

At the present time, the contactor diagnostics are based on the coherence of the signals they supply to the ECU. Thus, when the signals (42, 44) coming from the two contactors are supplying a low logic state (zone 2), the ECU interprets these signals as meaning that the brake pedal 1 is both depressed and released. This situation arises during a phase known as a transient phase, when a user depresses the brake pedal just as the contactors change position because they do not switch over exactly at the same moment. This then is a state known as an incoherent state and this incoherence may be interpreted as a fault with one of the contactors when it lasts for too long. However, a driver may also enter and remain in this zone 2, known as the incoherent zone, when he rests his foot lightly on the brake pedal. This may also arise when the vehicle is stationary (for example at a red light) or when it is driving along if the driver prepositions his foot over the brake pedal in anticipation of a need to brake. In all these scenarios, there is not necessarily a fault with one of the contactors A and B.

It is therefore important for the ECU to be able to tell the difference between a transient state of the contactors A and B and a true fault because in the latter instance it is necessary to let the repair shop and/or the driver know that a repair is needed.

In order to solve this problem, it has been proposed that the ECU should start a time out when the incoherent zone of FIG. 3 is entered. This makes it possible to take account of the transient state and avoid falsely diagnosing a fault with the contactors.

However, the inventors have found that in some cases, implementing this type of diagnostics still leads to far too many detections of false faults or non-detection of faults.

Furthermore, the diagnostics of the prior art may, under some circumstances, consider the contactors to be operating normally even though they are faulty. For example, in the event of an open circuit on contactor A, the contactors are once again considered to be operating as soon as the driver brakes. This causes a transition from the incoherent zone to the braking zone. However, contactor A is still faulty.

BRIEF SUMMARY

It is one object of the invention to solve the problems of the prior art by providing an improved diagnostics method for brake pedal contactors.

The invention therefore proposes a diagnostics method for diagnosing contactors for the brake pedal of a motor vehicle comprising an electronic control unit (ECU), the contactors being connected to the ECU and supplying it with information regarding the position of the pedal (1), characterized in that it comprises a step during which the ECU tests the signals coming from the contactors, and if these signals indicate that the current state of operation is a state known as the incoherent state, in which the brake pedal is considered by the ECU to be both depressed and released, the ECU begins a time out, the length of the time out being dependent on the speed of the vehicle.

By virtue of the method according to the invention, the speed of travel of the vehicle is taken into consideration in order to diagnose the state of operation of the contactors. Hence, when the speed of the vehicle is low, it is considered that the driver can remain in a transient state, depressing the brake pedal lightly, for example because he is at a red light, for a lengthy period of time, without a brake contactor fault being flagged up. This feature makes it possible to reduce the incidence of false detection of faults.

By contrast, above and beyond a certain vehicle speed, entry into the incoherent zone is permitted for a shorter period of time, and the time taken to detect contactor fault is thereby shortened. Hence, the incidence of non-detection of contactor faults is reduced.

According to other features of the method, considered separately or in combination:
the ECU compares the speed of the vehicle against a threshold value and if the speed is greater than the threshold, the length of the time out is equal to a first value, otherwise the length of the time out is equal to a second value, the first value being smaller than the second value;
at the end of the time out having the first value, if the ECU detects that the signals coming from the contactors are indicating that the pedal is still in the state known as the incoherent state, the ECU declares that one of the contactors is defective;
at the end of the time out having the second value, if the ECU detects that the signals coming from the contactors are indicating that the pedal is still in the state known as the incoherent state, the ECU declares one of the contactors (A, B) to be defective;

the method comprises a step during which the ECU checks that the signals coming from the contactors are indicating that the pedal has switched from a state known as the incoherent state to a state known as the depressed state or from a state known as the incoherent state to a state known as the released state;

if the signals coming from the contactors are indicating to the ECU that the pedal is remaining in the depressed state or in the released state for a predetermined length of time, the ECU next checks that the pedal has switched from a state known as the depressed state to a state known as the released state or from a state known as the released state to a state known as the depressed state;

if the signals coming from the contactors are indicating to the ECU that the pedal is remaining in the state known as the released state or in the state known as the depressed state for a predetermined length of time, the ECU declares the contactors not to be defective.

BRIEF DESCRIPTION OF THE DRAWINGS

Further features and advantages of the invention will become apparent from reading the detailed description which will follow, for an understanding of which reference will be made to the attached drawings, among which.

DETAILED DESCRIPTION

Figure 1:
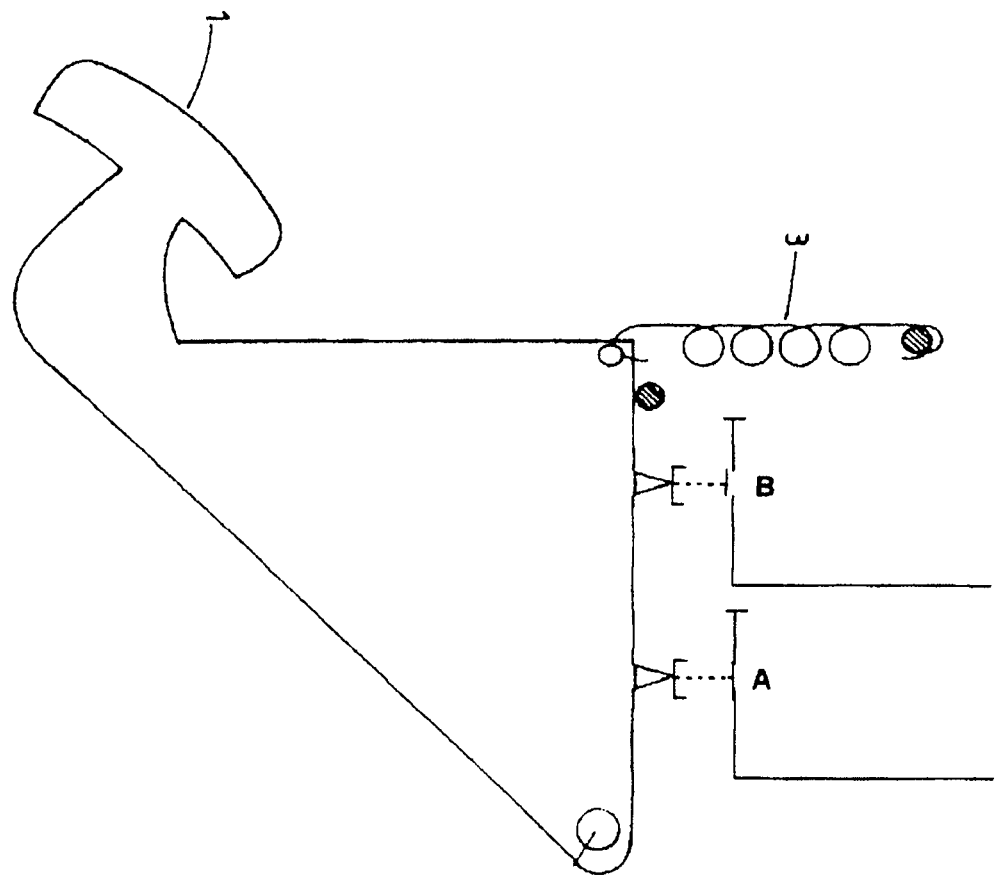
FIG. 1, already described, schematically depicts a motor vehicle brake pedal.
Figure 2:
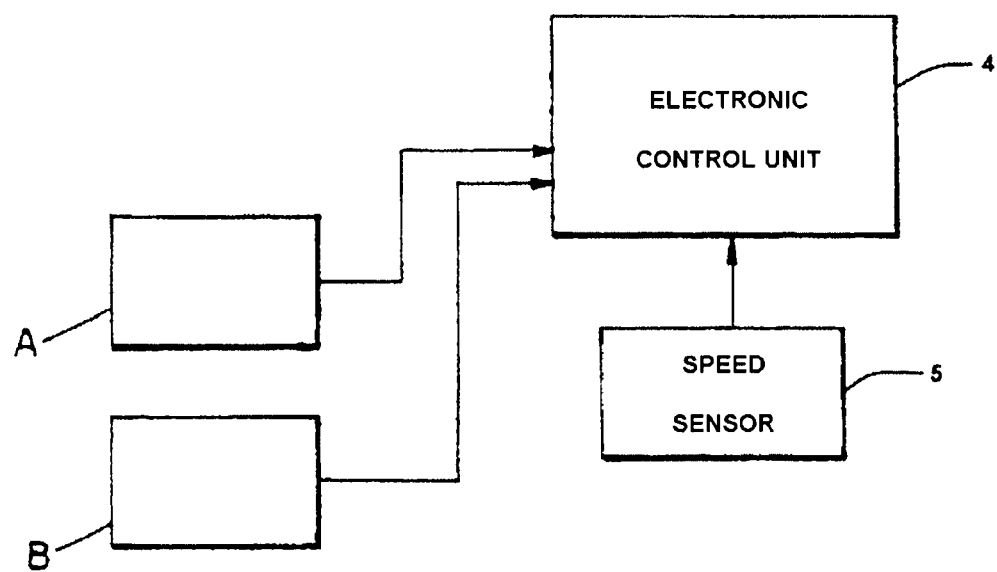
FIG. 2 already described is a schematic view of an electronic control unit of a motor vehicle, connected to various sensors, FIG. 3 already described is a time chart showing the various logic states of the signals coming from the contactors.

Reference is now made to FIG. 2. In addition to the information coming from the contactors, the ECU also receives "vehicle speed" information from a speed sensor 5.

Figure 3:
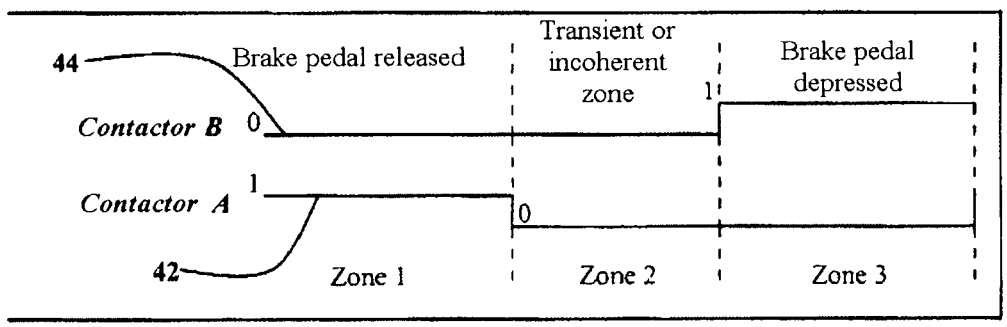
Figure 4:
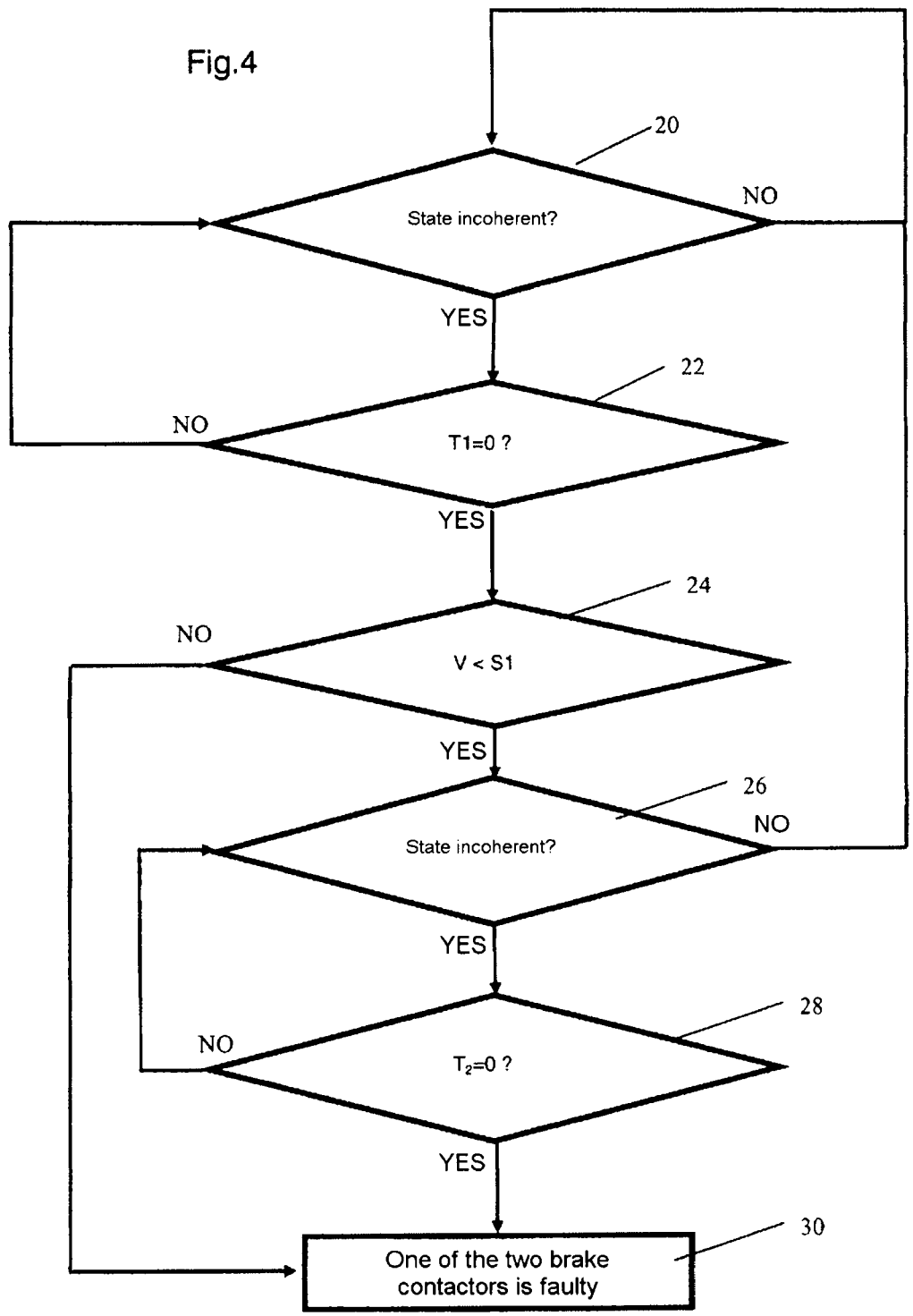
FIG. 4 is a flow diagram of the first part of the method according to the invention.

The contactors diagnostics method will now be described with reference to FIG. 4. In step 20, the ECU uses the signals coming from the contactors A and B to check whether the state is an incoherent state (zone 2 of FIG. 3). If it is not, the test of step 20 is performed again. If the state really is an incoherent state, the ECU starts a time out T1 (this step is not depicted). The time out may, for example, last around 10 seconds or so. In step 22, the ECU tests whether the time out T1 has elapsed. If it has not, the test provided in step 20 is repeated. If the time out T1 has elapsed, in step 24, the ECU compares the vehicle speed against a preset threshold S1. Advantageously, this threshold is of the order of 10 km/h or so. If the speed V of the vehicle is above the threshold S1, one of the two contactors is declared faulty in step 30. If not, the ECU once again in step 26 checks whether the signals coming from the contactors A and B are still indicating that the state is an incoherent state. If they are not, the test of step 20 is performed. If the state is still an incoherent state, the ECU starts a second time out T2 (this step is not depicted). The time out T2 may, for example, last 10 minutes or so. In step 28, the ECU tests whether the time out T2 has elapsed. If it has not, the test of 26 is performed. If the time out T2 has elapsed, one of the two contactors is declared to be faulty in step 30.

The length of the time out before the fault is signaled is therefore dependent on the speed of travel of the vehicle. Specifically, the total time out amounts to T1 if the speed is high and T4=T1+T2 if the vehicle is moving slowly.

According to the invention, the clearing of a fault takes account not only of the state of the contactors but also of the situation in which the vehicle finds itself. This feature makes it possible to avoid clearing faults needlessly.

After having detected that there is a fault with one of the contactors A and B, it is important to determine whether this fault is a passing fault or whether it is a permanent fault and therefore whether it requires a repair.

Figure 5:
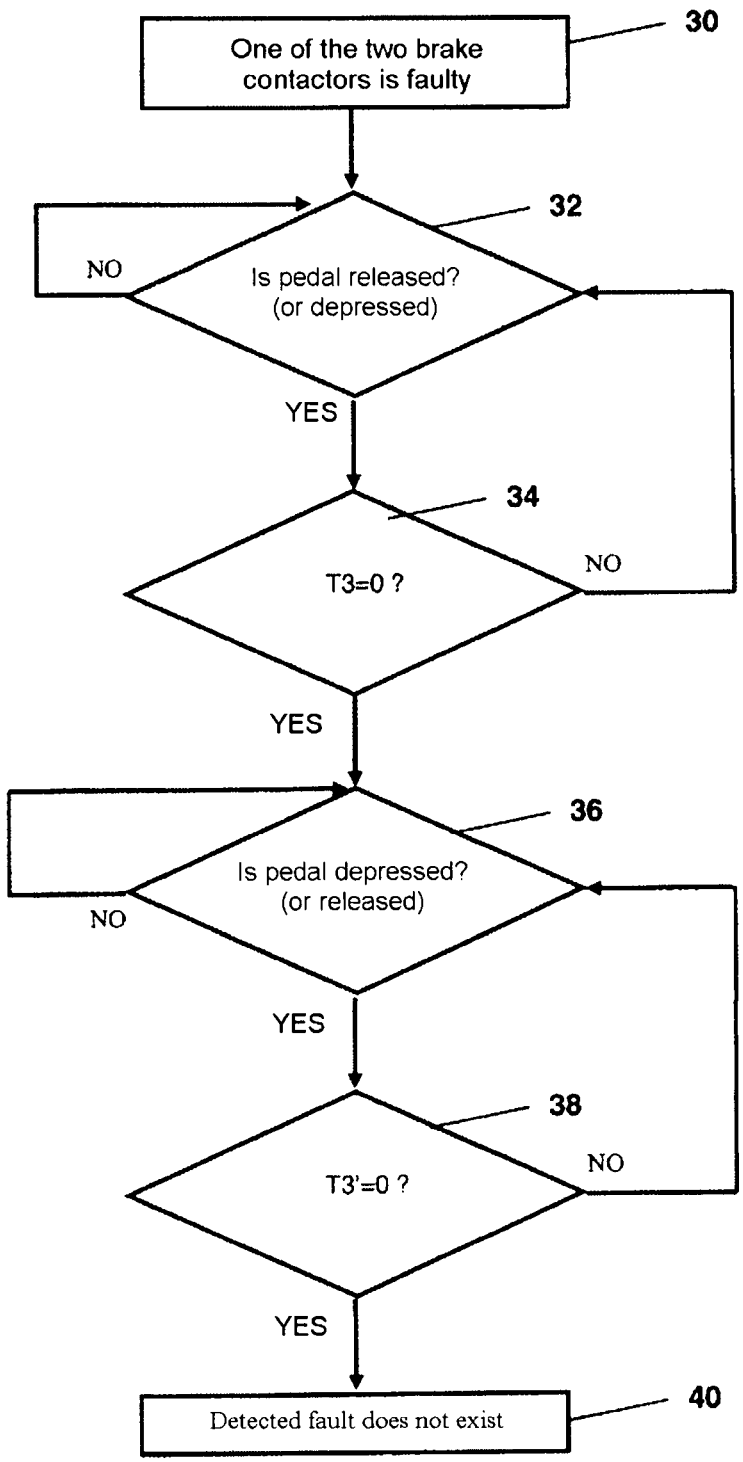
FIG. 5 is a flow diagram of the second part of the method according to the invention.

Reference is now made to FIG. 5. When, after step 30, the ECU has determined that one of the contactors is faulty, in step 32 the ECU tests whether the signals coming from the contactors A and B make it possible to determine whether the brake pedal is in the released state (or depressed state). This test makes it possible to determine whether the incoherent state has been left for another state in FIG. 3. The ECU performs the test of step 32. If there has indeed been a switch from the incoherent state to another state, the ECU starts a time out T3 (this step is not depicted). The time out T3 lasts for example 300 ms. In step 34, the ECU tests whether the time out T3 has elapsed. If it has not, the step 32 is performed. If the time out T3 has elapsed, the ECU tests whether the information coming from the contactors A and B makes it possible to determine whether the brake pedal has been depressed (or released). This test makes it possible to determine whether there has been a switch from the depressed state of FIG. 3 (or released state) to the released state (or depressed state). If such a switch has not occurred, step 36 is performed. If the signals coming from the contactors A and B indicate that the brake pedal has switched from the depressed (or released) state to the released (or depressed) state, the ECU starts a time out T3'. The time out T3' lasts, for example, 300 ms. In step 38, the ECU tests whether the time out T3' has elapsed. If it has not, step 38 is performed. If the time out T3' has elapsed, the fault that had been detected previously is detected by the ECU not to exist in step 40, and the contactors are declared not to be defective.

Thanks to this check on whether the fault has disappeared, the contactors diagnostics according to the invention are more reliable than known diagnostics. Indeed, if the contactor A has developed a fault, for example in open circuit, depressing the brake pedal will cause the switch from the incoherent zone to the braking zone. A conventional diagnostics method would therefore consider that the contactor had become sound again. By contrast, in order for the fault to disappear applying the method according to the invention it would be necessary for there to be a switch from the braking zone to the pedal released zone. However, that cannot happen because the contactor is in open circuit. Thus, the fault with contactor A will continue to be flagged up by virtue of the method according to the invention.

The invention claimed is:

1. A diagnostics method for diagnosing contactors for a brake pedal of a motor vehicle including an electronic control unit (ECU), the contactors being connected to the ECU and supplying the ECU with information regarding a position of the pedal, the method comprising:

testing, via the ECU, the signals coming from the contactors, and if the signals indicate a current state of operation is an incoherent state, in which the brake pedal is considered by the ECU to be both depressed and released, the ECU begins a first portion of a time out during which the ECU repeatedly tests the signals from the contactors to determine if the signals indicate the incoherent state;

after the first portion of the time out is complete and the signals coming from the contactors indicate the incoherent state, comparing a speed of the vehicle to a predetermined speed;

indicating that one of the brake contactors is faulty when the signals coming from the contactors indicate the incoherent state and the speed of the vehicle is above the predetermined speed;

beginning, via the ECU, a second portion of the time out during which the ECU repeatedly tests the signals from the contactors to determine if the signals indicate the incoherent state when the speed of the vehicle is below the predetermined speed such that a length of the time out is dependent on the speed of the vehicle, the time out being a total time during which the ECU repeatedly tests the signals from the contactors; and after the second portion of the time out is complete and the signals coming from the contactors indicate that the current state of operation is the incoherent state, indicating that one of the brake contactors is faulty.

2. The method as claimed in claim 1, further comprising:

after the indicating that one of the brake contactors is faulty, checking, via the ECU, whether the signals coming from the contactors are indicating the pedal has switched from the incoherent state to a depressed state or from the incoherent state to a released state.

3. The method as claimed in claim 2, wherein if the signals coming from the contactors are indicating to the ECU the pedal is remaining in the depressed state or in the released state for a predetermined length of time, the ECU next checks whether the pedal has switched from the depressed state to the released state or from the released state to the depressed state.

4. The method as claimed in claim 3, wherein if the signals coming from the contactors are indicating to the ECU the pedal is remaining in the released state or in the depressed state for a predetermined length of time, the ECU declares the contactors to be functioning.

5. The method as claimed in claim 1, wherein the length of the time out when the speed of the vehicle is above the predetermined speed is shorter than the length of the time out when the speed of the vehicle is below the predetermined speed.

6. The method as claimed in claim 1, wherein the predetermined speed is 10 km/h such that the length of the time out when the speed of the vehicle is above 10 km/h at the end of the first portion is shorter than the length of the time out when the speed of the vehicle is below 10 km/h.

7. The method as claimed in claim 1, wherein the second portion of the time out is 10 minutes.

* * * * *